(12) United States Patent
Kim et al.

(10) Patent No.: US 11,079,230 B2
(45) Date of Patent: Aug. 3, 2021

(54) FIBER-OPTIC GYROSCOPE (FOG) ASSEMBLY

(71) Applicants: Steven M. Kim, Santa Clarita, CA (US); Gregory A. Zimmerman, Sandy, UT (US); Daniel A. Tazartes, West Hills, CA (US); Brent Robert Bateman, Moorpark, CA (US)

(72) Inventors: Steven M. Kim, Santa Clarita, CA (US); Gregory A. Zimmerman, Sandy, UT (US); Daniel A. Tazartes, West Hills, CA (US); Brent Robert Bateman, Moorpark, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 322 days.

(21) Appl. No.: 16/409,375

(22) Filed: May 10, 2019

(65) Prior Publication Data
US 2020/0355501 A1    Nov. 12, 2020

(51) Int. Cl.
*G01C 19/72* (2006.01)

(52) U.S. Cl.
CPC .................................. *G01C 19/722* (2013.01)

(58) Field of Classification Search
CPC ..... G01C 19/72; G01C 19/721; G01C 19/722
See application file for complete search history.

(56) References Cited

U.S. PATENT DOCUMENTS

| 3,789,674 A | 2/1974 | Anderson et al. |
|---|---|---|
| 4,048,859 A | 9/1977 | Babcock |

(Continued)

FOREIGN PATENT DOCUMENTS

| CN | 102607548 B | 12/2014 |
|---|---|---|
| EP | 0553877 A1 | 8/1993 |

(Continued)

OTHER PUBLICATIONS

Stephens M: "Sensitive Interferometric Accelero Meter," Review of Scientific Instraments, AIP, Melville, NY, US, vol. 64, No. 9, Sep. 1, 1993, pp. 2612-2614, XP000395640, ISSN: 0034-6748, DOI: 10.1063/1.1143878.

(Continued)

*Primary Examiner* — Michael A Lyons
(74) *Attorney, Agent, or Firm* — Tarolli, Sundheim, Covell & Tummino LLP

(57) ABSTRACT

One example includes a FOG assembly including a spool that includes a flattened portion corresponding to a flange comprising an axial center corresponding to a sensitive axis about which an associated FOG system is configured to measure rotation. The FOG assembly also includes a magnetic shield arranged as a capped concentric cover about the sensitive axis and coupled to the spool and the flange to create a toroidal cavity between the magnetic shield and the flange. A fiber coil is disposed within the toroidal cavity and coupled to the flange. The fiber coil includes an optical fiber which is counter-wound in first and second orientations. The fiber coil has an axial dimension along the sensitive axis that is less than or equal to approximately 160% of a radial width corresponding to a difference between an outer radius and an inner radius of the fiber coil.

21 Claims, 3 Drawing Sheets

(56) References Cited

U.S. PATENT DOCUMENTS

| | | | |
|---|---|---|---|
| 4,157,495 A | 6/1979 | Grover et al. | |
| 4,226,120 A | 10/1980 | Nissl | |
| 4,275,296 A | 6/1981 | Adolfsson | |
| 4,430,616 A | 2/1984 | Grover | |
| 4,699,451 A | 10/1987 | Mohr | |
| 4,793,708 A | 12/1988 | Bednarz | |
| 4,992,656 A | 2/1991 | Clauser | |
| 5,004,341 A | 4/1991 | Grynberg et al. | |
| 5,274,232 A | 12/1993 | Chu et al. | |
| 5,326,963 A | 7/1994 | Shahram | |
| 5,394,233 A | 2/1995 | Wang | |
| 5,896,199 A * | 4/1999 | Mark | G01C 19/722 356/465 |
| 5,973,783 A | 10/1999 | Goldner et al. | |
| 6,009,111 A | 12/1999 | Corwin et al. | |
| 6,209,972 B1 | 4/2001 | Matsuno | |
| 6,303,928 B1 | 10/2001 | Buell et al. | |
| 6,320,664 B1 * | 11/2001 | Kaliszek | G01C 19/722 356/464 |
| 6,421,421 B1 | 7/2002 | McGeoch | |
| 6,462,824 B1 * | 10/2002 | McLean | G01C 19/722 356/459 |
| 6,538,748 B1 | 3/2003 | Tucker et al. | |
| 6,635,867 B2 | 10/2003 | Kajita | |
| 6,744,038 B2 | 6/2004 | Wang et al. | |
| 6,763,718 B1 | 7/2004 | Waters et al. | |
| 7,139,446 B2 | 11/2006 | Slotwinski | |
| 7,222,534 B2 | 5/2007 | Maas et al. | |
| 7,355,720 B1 | 4/2008 | Carr | |
| 7,645,987 B2 | 1/2010 | Chang et al. | |
| 7,711,130 B2 | 5/2010 | Husung | |
| 7,751,042 B2 | 7/2010 | Okuno | |
| 7,808,618 B1 | 10/2010 | Tawney et al. | |
| 7,826,629 B2 | 11/2010 | Miles et al. | |
| 7,880,894 B2 | 2/2011 | Hirata et al. | |
| 7,965,148 B2 | 6/2011 | Larsen | |
| 8,072,609 B1 | 12/2011 | Trivedi et al. | |
| 8,201,452 B2 | 6/2012 | Oldsen et al. | |
| 8,205,497 B1 | 6/2012 | Okandan et al. | |
| 8,542,956 B2 | 9/2013 | Akkaya et al. | |
| 8,663,731 B2 | 3/2014 | Wang et al. | |
| 8,813,571 B2 | 8/2014 | Iwamoto et al. | |
| 8,941,053 B1 | 1/2015 | Biedermann et al. | |
| 9,086,429 B1 | 7/2015 | Biedermann et al. | |
| 2003/0081218 A1 | 5/2003 | Orban | |
| 2003/0132749 A1 | 7/2003 | Speier et al. | |
| 2004/0046111 A1 | 3/2004 | Swierkowski | |
| 2004/0149037 A1 | 8/2004 | Digonnet et al. | |
| 2004/0227032 A1 | 11/2004 | Gregory | |
| 2005/0041252 A1 * | 2/2005 | Gilbreath | G01C 19/722 356/460 |
| 2005/0052724 A1 | 3/2005 | Suzuki et al. | |
| 2006/0032471 A1 | 2/2006 | Yalin et al. | |
| 2006/0066675 A1 | 3/2006 | Huber et al. | |
| 2006/0181712 A1 | 8/2006 | Degertekin et al. | |
| 2007/0236704 A1 | 10/2007 | Carr | |
| 2007/0261489 A1 | 11/2007 | Murelitharan | |
| 2007/0266784 A1 | 11/2007 | Lust et al. | |
| 2008/0046214 A1 | 2/2008 | Fowler | |
| 2008/0163686 A1 | 7/2008 | Carr | |
| 2008/0225274 A1 | 9/2008 | Hirata et al. | |
| 2008/0278710 A1 | 11/2008 | Schmidt et al. | |
| 2008/0291457 A1 | 11/2008 | Carr | |
| 2008/0296483 A1 | 12/2008 | McClelland et al. | |
| 2009/0122319 A1 | 5/2009 | Ronnekleiv et al. | |
| 2009/0154308 A1 | 6/2009 | Kato | |
| 2009/0214157 A1 | 8/2009 | Okubo et al. | |
| 2009/0268211 A1 | 10/2009 | Carr et al. | |
| 2009/0309668 A1 | 12/2009 | Bulatowicz et al. | |
| 2010/0007345 A1 | 1/2010 | Kanegsberg | |
| 2010/0046002 A1 | 2/2010 | Perez et al. | |
| 2011/0292321 A1 | 12/2011 | Travis et al. | |
| 2011/0303008 A1 | 12/2011 | Zhang et al. | |
| 2011/0311186 A1 | 12/2011 | Adams | |
| 2012/0116709 A1 | 5/2012 | Martin et al. | |
| 2012/0143018 A1 | 6/2012 | Skidmore et al. | |
| 2013/0104655 A1 | 5/2013 | Andresen et al. | |
| 2013/0230329 A1 | 9/2013 | Sangawa et al. | |
| 2013/0327146 A1 | 12/2013 | Meyer et al. | |
| 2014/0054451 A1 | 2/2014 | Abedin et al. | |
| 2014/0070082 A1 | 3/2014 | Guo et al. | |
| 2014/0374581 A1 | 12/2014 | Dionne | |
| 2015/0015251 A1 | 1/2015 | Bulatowicz | |
| 2015/0316625 A1 | 11/2015 | Bulatowicz | |
| 2018/0162679 A1 * | 6/2018 | Guattari | G01J 9/02 |
| 2019/0113343 A1 * | 4/2019 | Kim | G01C 19/726 |

FOREIGN PATENT DOCUMENTS

| | | |
|---|---|---|
| EP | 2104406 A1 | 9/2009 |
| EP | 2520940 A1 | 11/2012 |
| GB | 1170067 A | 11/1969 |
| JP | 01214719 A | 8/1989 |
| JP | 01231500 A | 9/1989 |
| JP | 62093603 A | 4/1997 |
| JP | 2008202959 A | 9/2008 |
| JP | 2005/283160 A | 10/2013 |
| WO | 2008/028138 A1 | 3/2008 |
| WO | 2010/094190 A1 | 8/2010 |
| WO | 2012/090134 A1 | 7/2012 |

OTHER PUBLICATIONS

European Office Action corresponding to European Application No. 13800603.6-1022, pp. 1-8, dated Jun. 24, 2019.

International Search Report for PCT/US2012/21432 dated May 14, 2012.

Larsen, U.S. Appl. No. 12/534,615, filed Aug. 3, 2009 entitled: "Atomic Frequency Clock Systems and Methods".

Marchant et al., "Off Resonance Laser Frequency Stabilization Using the Faraday Effect", Optics Letters, Optical Society of America, vol. 36, No. 1, Jan. 1, 2011, pp. 64-66.

Extended European Search Report for Application No. 14194040.3 dated Feb. 10, 2015, pp. 1-6.

Japanese Office Action for JP 2017-058770 dated Mar. 6, 2018.

Extended European Search report for EP 17 16 0682 dated Jul. 5, 2017.

European Search Report for EP 18000808.8 dated Feb. 13, 2019.

* cited by examiner

FIBER-OPTIC GYROSCOPE (FOG) ASSEMBLY

TECHNICAL FIELD

This disclosure relates generally to sensor systems, and specifically to a fiber-optic gyroscope (FOG) assembly.

BACKGROUND

There are a number different types of gyroscope systems that are configured to measure angular rotation rate about a sensitive (e.g., input) axis. Some gyroscopes implement optical signals to determine angular rotation rate about the sensitive axis. As an example, optical signal gyroscopes can monitor changes in phase of the optical signals to determine rotation about the sensitive axis. For example, a fiber optic gyroscope (FOG) can sense a change in orientation using the Sagnac effect, such as based on the interference of light which has passed through a coil of optical fiber (e.g., that is tens to thousands of meters long). As an example, a FOG can be implemented using two beams from a light source that are injected into the same fiber in opposite directions, such that the beam travelling against the rotation experiences a slightly shorter path delay than the other beam. As a result, the differential phase shift can be measured through interferometry, thus translating angular velocity into a shift of the interferometric intensity which is measured photometrically.

SUMMARY

One example includes a FOG assembly including a spool that includes a flattened portion corresponding to a flange comprising an axial center corresponding to a sensitive axis about which an associated FOG system is configured to measure rotation. The FOG assembly also includes a magnetic shield arranged as a capped concentric cover about the sensitive axis and coupled to the spool and the flange to create a toroidal cavity between the magnetic shield and the flange. A fiber coil is disposed within the toroidal cavity and coupled to the flange. The fiber coil includes an optical fiber which is counter-wound in first and second orientations. The fiber coil has an axial dimension along the sensitive axis that is less than or equal to approximately 160% of a radial width corresponding to a difference between an outer radius and an inner radius of the fiber coil.

Another example includes a method of fabricating a FOG assembly. The method includes counter-winding an optical fiber in each of a first orientation and a second orientation opposite the first orientation. The method also includes applying a potting material to the optical fiber to generate a fiber coil having a ring shape and comprising the optical fiber and the potting material, such that the fiber coil has an optical fiber density of greater than or equal to approximately 28,000 optical fibers per square inch of cross-sectional area of the fiber coil. The method also includes applying a buffer material on a flange corresponding to a flattened portion of a spool comprising an axial center corresponding to a sensitive axis about which an associated FOG system is configured to measure rotation. The method further includes disposing the fiber coil within a toroidal cavity formed between the buffer material and the flange, and a magnetic shield arranged as a capped concentric cover about the sensitive axis and coupled to the flange.

Another example includes an interferometric FOG. The FOG includes a FOG assembly. The FOG assembly includes a spool comprising a flange corresponding to a flattened portion comprising an axial center corresponding to a sensitive axis about which the interferometric FOG is configured to measure rotation. The FOG assembly also includes a magnetic shield arranged as a capped concentric cover about the sensitive axis and coupled to the spool and the flange to create a toroidal cavity between the magnetic shield and the flange. The FOG assembly also includes a buffer material that is coupled to the flange within the toroidal cavity. The FOG assembly further includes a fiber coil disposed within the toroidal cavity and coupled to the buffer material, the fiber coil comprising an optical fiber having a length that is greater than approximately 1 kilometer and which is counter-wound in a first orientation and a second orientation opposite the first orientation, the fiber coil having an axial dimension along the sensitive axis that is less than or equal to approximately 0.5 inches and a radial width corresponding to a difference between an outer radius and an inner radius of the fiber coil that is less than or equal to approximately 0.35 inches. The FOG further includes an optical signal in the optical fiber to determine a rotation about the sensitive axis of the FOG assembly.

DETAILED DESCRIPTION

This disclosure relates generally to sensor systems, and specifically to a fiber-optic gyroscope (FOG) assembly. The FOG assembly can include a spool that includes a flange coupled to at least one of the ends of the spool. The spool includes an axial center that can correspond to a sensitive axis about which the FOG assembly is configured to rotate, such that an optical transceiver associated with the FOG system can determine the rotation about the sensitive axis, as described herein. The FOG assembly also includes a magnetic shield arranged as a capped concentric cover around the axial center to form a toroidal cavity between the magnetic shield, the spool, and the flange. The FOG assembly further includes a fiber coil that is arranged within the toroidal cavity and which includes an optical fiber that is counter-wound in a first orientation and in a second orientation opposite the first orientation. For example, the fiber coil can include a potting material that is applied to solidify the fiber coil to have predefined dimensions.

The optical fiber can be fabricated to have a cross-sectional diameter of less than or equal to approximately 135 micrometers (μm). For example, the optical fiber can have a cross-sectional diameter of between approximately 125 μm and approximately 135 μm. The optical fiber can have a length of greater than approximately 1 kilometer. For example, the fiber coil can be formed to have an axial dimension along the sensitive axis that is less than or equal to approximately 160% of a radial width corresponding to a difference between an outer radius and an inner radius of the fiber coil. As an example, the axial dimension can be less than or equal to approximately 0.5 inches, and the radial width can be less than or equal to approximately 0.35 inches. By fabricating the fiber coil using the smaller cross-sectional optical fiber at the dimensional ratio of approximately 160% with respect to the axial dimension and the radial width, the resulting FOG (e.g., interferometric FOG) can be less susceptible to errors resulting from external magnetic fields, temperature gradients, and vibration, as described herein.

Figure 1:
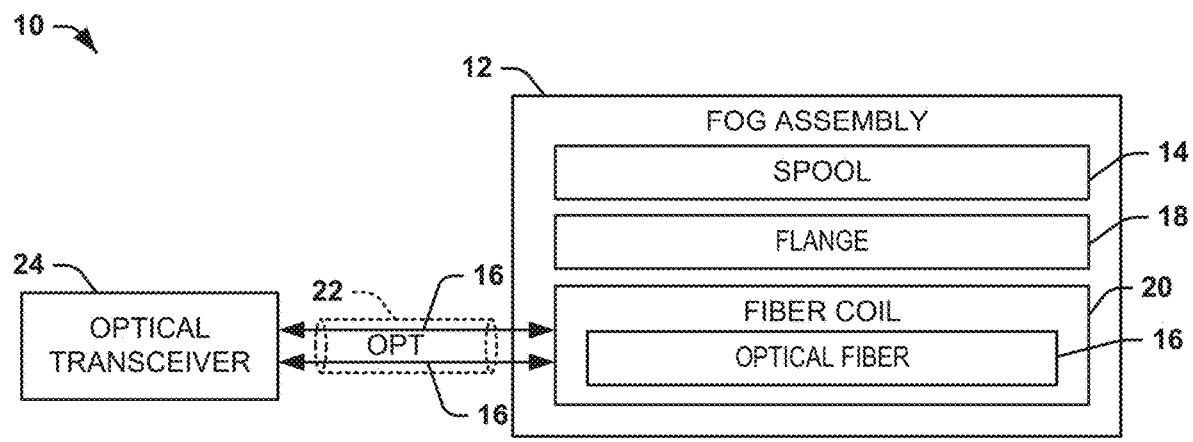
FIG. 1 illustrates an example of a FOG system.

FIG. 1 illustrates an example of a FOG system 10. As an example, the FOG system 10 can be implemented in any of a variety of applications in which accurate rotation of a device or vehicle is required. For example, the FOG system 10 can be used for navigation (e.g., nautical or aerospace) and/or positioning (e.g., satellites or ordnance). As an example, the FOG system 10 can be configured as an interferometric FOG system. However, the FOG system 10 can instead correspond to a different type of a FOG system, such as a resonant FOG system.

The FOG system 10 includes a FOG assembly 12 that includes a spool 14 and an optical fiber 16. The spool 14 corresponds to a rigid body to which the optical fiber 16 is coupled. As an example, the spool 14 can also include one or more securing components for securing the FOG assembly 12, for example to a vehicle body (not shown), for determining rotation of the FOG assembly 12 about a sensitive axis that can correspond to an axial center of the spool 14. In the example of FIG. 1, the spool 14 includes a flange 18 that can correspond to a flattened cylindrical portion of the spool 14, the axial center of which corresponds to a sensitive axis about which the FOG system 10 is configured to measure rotation. As an example, the flange 18 can be formed integral with the spool 14, or can be formed as a separate piece that is secured to other portions of the spool 14. For example, the spool 14 can include a portion that extends axially from the flange 18.

In the example of FIG. 1, the optical fiber 16 forms a fiber coil 20 that is coupled to the spool 14 and/or the flange 18. The fiber coil 20 includes the optical fiber 16 being counterwound in a first orientation about a central axis (e.g., a sensitive axis) and in a second orientation (e.g., about the sensitive axis) opposite the first orientation. For example, the winding of the optical fiber 16 to form the fiber coil 20 can be based on a quadrupole wind pattern or as an octopole wind pattern. As another example, the fiber coil 20 can be secured in a solidified liquid material (e.g., an epoxy or other type of material that maintains the optical fiber 16 in a ring-shaped arrangement of the fiber coil 20; hereinafter referred to as "potting material"). As an example, the flange 18 can have a first surface to which the fiber coil 20 is coupled.

As an example, the optical fiber 16 can be fabricated to have a cross-sectional diameter of less than or equal to approximately 135 micrometers (μm). For example, the optical fiber 16 can have a cross-sectional diameter of between approximately 125 μm and approximately 135 μm. As another example, the optical fiber 16 can have a length of greater than approximately 1 kilometer, such as for implementation in an interferometric gyroscope. Based on the narrower fiber cross-sectional diameter (e.g., relative to a typical optical fiber having a cross-sectional diameter of greater than or equal to approximately 155 μm), the fiber coil 20 can have reduced cross-sectional dimensions that can be selected to mitigate errors associated with operation of the resulting FOG.

For example, the fiber coil 20 can be formed to have an axial dimension along the sensitive axis that is less than or equal to approximately 160% of a radial width corresponding to a difference between an outer radius and an inner radius of the fiber coil 20. As an example, the axial dimension can be less than or equal to approximately 0.5 inches, and the radial width can be less than or equal to approximately 0.35 inches. By fabricating the fiber coil 20 using the smaller cross-sectional optical fiber at the dimensional ratio of approximately 160% with respect to the axial dimension and the radial width, the resulting FOG (e.g., interferometric FOG) can be less susceptible to errors resulting from external magnetic fields, temperature gradients, and vibration, as described herein.

The optical fiber 16 extends from the fiber coil 20 (e.g., as extending from the potting material) along a longitudinal coupling portion 22. The longitudinal coupling portion 22 is coupled to an optical transceiver 24 that is configured to generate an optical signal OPT that is provided to each of the respective ends associated with the optical fiber 16. The longitudinal coupling portion can correspond to a portion of the optical fiber 16 that is coupled to the optical transceiver 24, such that two separate lengths of the optical fiber 16 are coupled together along the length of the longitudinal coupling portion 28 to form a bidirectional fiber-optic cable. As an example, a portion of the longitudinal coupling portion 22 can be secured to the flange 18. Therefore, the optical transceiver 24 can be configured to determine rotation of the FOG assembly 12 about the sensitive axis based on the optical signal OPT.

Figure 2:
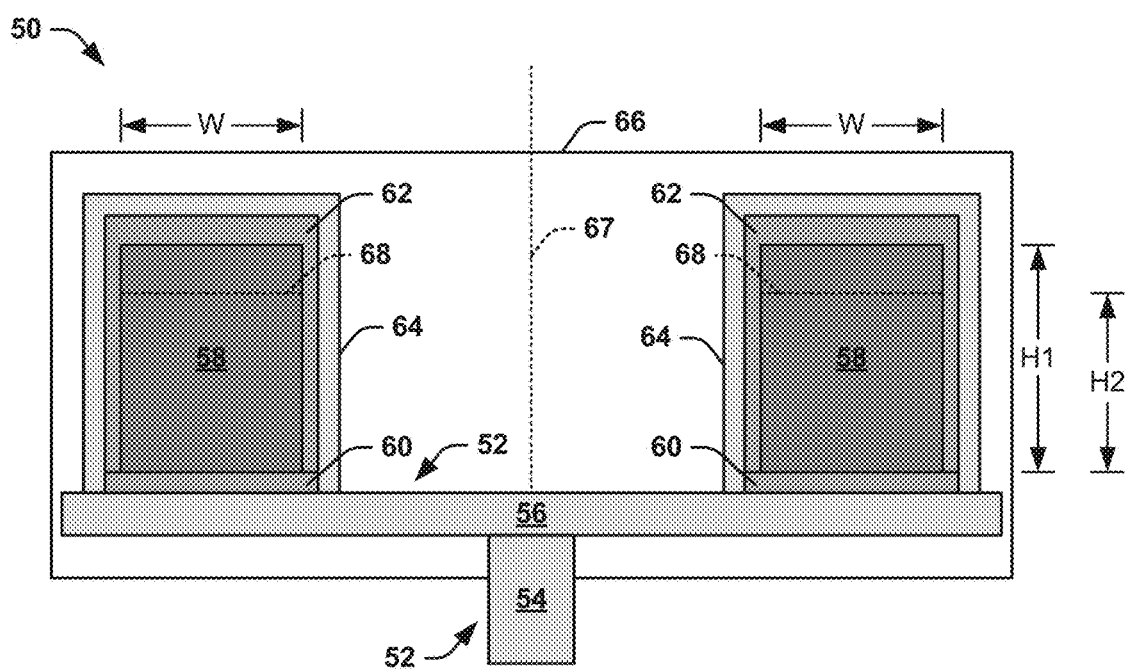
FIG. 2 illustrates an example diagram of a FOG assembly.

FIG. 2 illustrates an example cross-sectional view of a FOG assembly 50. The FOG assembly 50 is demonstrated as an approximate diametrical cross-sectional view of the FOG assembly 12 in the example of FIG. 1. Therefore, reference is to be made to the examples of FIG. 1 in the following description of the example of FIG. 2.

The FOG assembly 50 includes a spool 52 that includes a securing component 54 (e.g., a screw or bolt) and a flange 56. The FOG assembly 50 also includes a fiber coil 58 that is coupled to the flange 56 via a buffer material 60 that is disposed on the flange 56. For example, the buffer material 60 can have a coefficient of thermal expansion (CTE) that is between the CTE of the fiber coil 58 (e.g., the potting material therein) and the CTE of the flange 56. As an example, the fiber coil 58 can be formed from an optical fiber having a length of greater than approximately 1 kilometer, such as for implementation in an interferometric gyroscope. In the example of FIG. 2, the fiber coil 58 and the buffer material 60 are enclosed within a cavity 62 having a toroidal shape (hereinafter "toroidal cavity"). The toroidal cavity 62 is formed from a magnetic shield 64 and the flange 56. As an example, the spool 52 can include integral portions that extend from the flange 56, such that the toroidal cavity 62 can be formed between the spool 52, the flange 56, and the magnetic shield 64. For example, the toroidal cavity 62 can be completely enclosed, such that no portion(s) of the fiber coil 58 are exposed. The magnetic shield 64 is configured as a capped concentric cover to substantially mitigate external magnetic fields that can deleteriously affect the performance of the associated FOG system. Additionally, the FOG assembly 50 can be substantially enclosed within a covering material 66 to substantially protect the components within the covering material 66 from physical impact or other sources of damage that could affect the integrity of the components in the FOG assembly 50.

Similar to as described in the example of FIG. 1, because the optical fiber can be fabricated to have a cross-sectional diameter of less than or equal to approximately 135 μm, the fiber coil 58 can have reduced cross-sectional dimensions that can be selected to mitigate errors associated with operation of the resulting FOG. In the example of FIG. 2, the fiber coil 58 is demonstrated as having a cross-sectional height, demonstrated as a dimension "H1" corresponding to an axial dimension along a sensitive axis, demonstrated at 67, that is based on being fabricated from a larger cross-sectional diameter optical fiber (e.g., 155 μm), such as in typical FOG assemblies. However, the example of FIG. 2 demonstrates a dotted line 68 corresponding to a height "H2" of the fiber coil 58 that is reduced relative to the height H1 of typical FOG assemblies. For example, the typical FOG assemblies can have a gap between a top surface of the associated fiber coil and an opposing ceiling surface of the magnetic shield that is less than or equal to approximately 0.05" (e.g., 0.045"). However, the cross-sectional diameter of less than or equal to approximately 135 μm of the optical fiber of the fiber coil 58 can result in a fiber coil 58 having the reduced height H2 dimension relative to the height H1 of the fiber coil of a typical FOG (e.g., a difference in height of greater than or equal to approximately 0.1"). Therefore, the FOG assembly 50 can have a gap between the top surface of the fiber coil 58 and an opposing ceiling surface of the magnetic shield 64 that is greater than or equal to approximately 0.15" (e.g., 0.160").

For example, similar to as described previously, the fiber coil 58 can be formed to have a height H that is less than or equal to approximately 160% of a radial width, demonstrated in the example of FIG. 2 as a dimension "W", corresponding to a difference between an outer radius and an inner radius of the fiber coil 58. As an example, the height H2 can be less than or equal to approximately 0.5 inches, and the radial width W can be less than or equal to approximately 0.35 inches. The optical fiber of cross-sectional diameter of less than or equal to approximately 135 μm can thus result in a greater density of optical fiber within the fiber coil 58 without compromising any of the functional characteristics of the resulting FOG, such as Angle Random Walk (ARW) of the resulting FOG. As an example, fiber coil 58 can have at least one of a number of layers of the optical fiber greater than or equal to fifty and a number of turns per layer of greater than or equal to eighty. For example, based on the cross-sectional diameter of less than or equal to approximately 135 μm of the optical fiber, the FOG assembly 58 can have a density of greater than or equal to approximately 28,000 optical fibers per square inch, such as based on having a radial pitch (e.g., center of fiber to center of fiber spacing) of at most 150 μm between layers of the optical fiber in the fiber coil 58, and based on having an axial pitch of at most 140 μm between turns in a given layer of the optical fiber in the fiber coil 58.

As an example, for the fiber coil 58 fabricated from an optical fiber having the cross-sectional diameter of less than or equal to approximately 135 μm, the fiber coil 58 can have an outer diameter of approximately 3.5" and an inner diameter of approximately 2.9", and a height H2 of approximately 0.5". The fiber coil 58 of these dimensions can be formed by implementing a radial pitch of 152 μm based on a layer spacing between layers of the optical fiber of approximately 17 μm, and implementing an axial pitch of 144 μm based on a turn-to-turn spacing between turns of the optical fiber of approximately 9 μm. The fiber coil 58 can be fabricated to have a total of 52 layers, with 83 turns per layer, for an optical fiber having a length of approximately 1095 meters. The example provided herein is but one specific example of fabrication of the fiber coil 58. However, it is to be understood that variations of the dimensions of the fiber coil 58 can be implemented to provide similar results.

By fabricating the fiber coil 58 using the smaller cross-sectional optical fiber at the dimensional ratio of approximately 160% with respect to the axial dimension and the radial width, the resulting FOG (e.g., interferometric FOG) can be less susceptible to errors resulting from external magnetic fields, temperature gradients, and mechanical vibration. For example, because of the reduction in height of the fiber coil 58 relative to a typical fiber coil, the resulting FOG can be less susceptible to vibration induced errors based on having a more stable physical structure. As an example, because the fiber coil 58 can have a reduced height relative to typical fiber coils, the fiber coil 58 can experience reduced vibration of the top portion of the fiber coil 58 (e.g., the portion opposite the portion secured to the buffer material 60) relative to typical fiber coils, which can thus mitigate vibration induced errors in the determination of rotation of the FOG assembly 50 (e.g., via the optical transceiver 30). Additionally, a reduced size and/or height of the fiber coil 58 can result in a reduction in temperature gradients through the fiber coil 58. Therefore, the reduced size and/or height of the fiber coil 58 can thus mitigate thermally induced errors in the determination of rotation of the FOG assembly 50 (e.g., via the optical transceiver 30).

Figure 3:
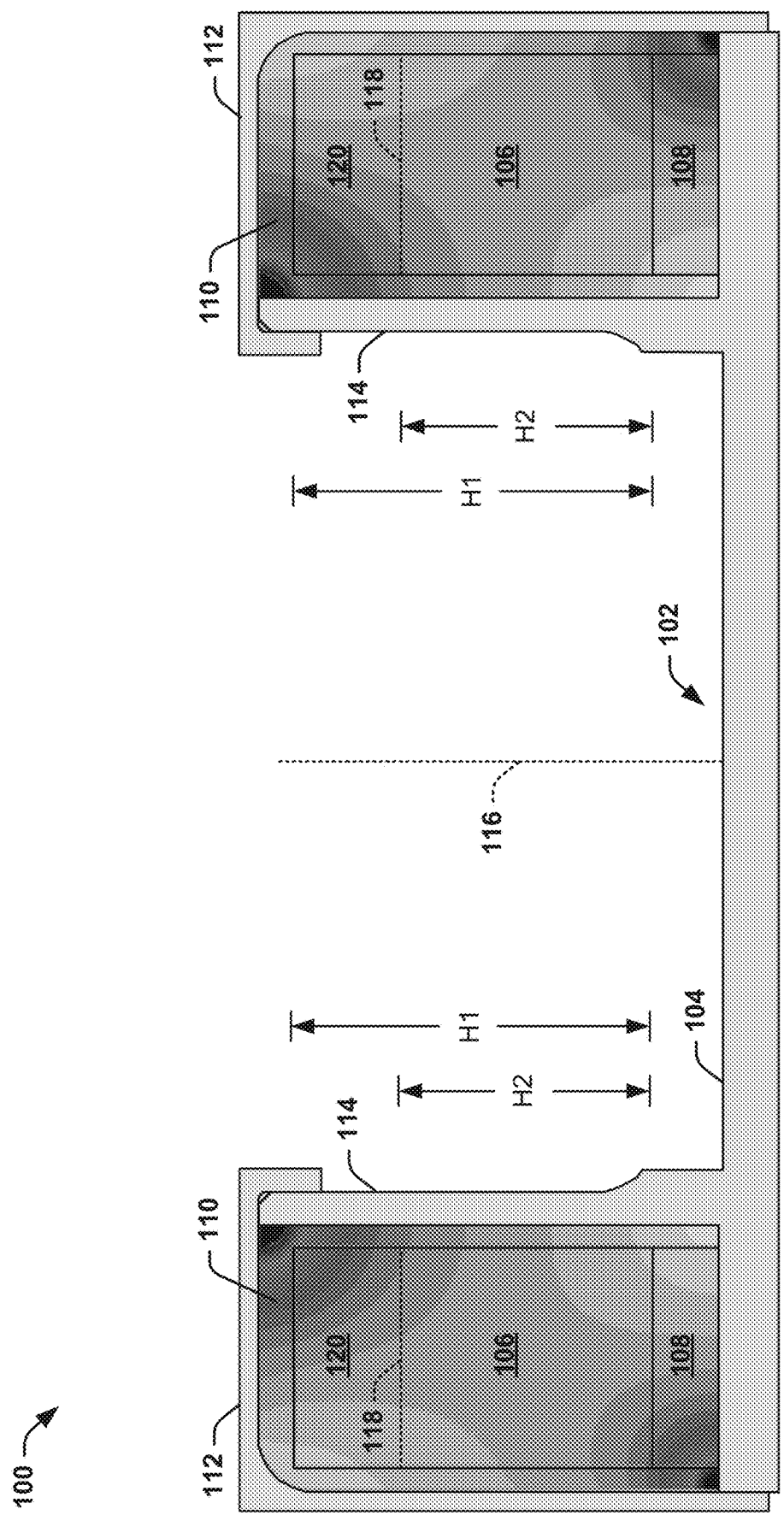
FIG. 3 illustrates another example diagram of a FOG assembly.

Additionally, the reduced size and/or height of the fiber coil 58 can result in a reduction of magnetic field induced errors in the determination of rotation of the FOG assembly 50 (e.g., via the optical transceiver 30). FIG. 3 illustrates an example cross-sectional view of a FOG assembly 100. The FOG assembly 100 is demonstrated as an approximate diametrical cross-sectional view of the FOG assembly 12 in the example of FIG. 1. Therefore, reference is to be made to the examples of FIGS. 1 and 2 in the following description of the example of FIG. 3.

The FOG assembly 100 includes a spool 102 that includes a flange 104. The FOG assembly 100 also includes a fiber coil 106 that is coupled to the flange 104 via a buffer material 108 that is disposed on the flange 104. As an example, the fiber coil 106 can be formed similar to as described herein, such as from an optical fiber having a cross-sectional diameter of between approximately 125 μm and approximately 135 μm. In the example of FIG. 3, the fiber coil 106 and the buffer material 108 are enclosed within a toroidal cavity 110 formed from a magnetic shield 112, an axial extension of the spool 114, and the flange 104. In the example of FIG. 3, the axial extension of the spool 114 is demonstrated as being integral with the flange 104.

Similar to as described in the example of FIG. 1, because the optical fiber can be fabricated to have a cross-sectional diameter of less than or equal to approximately 135 μm, the fiber coil 106 can have reduced cross-sectional dimensions that can be selected to mitigate errors associated with operation of the resulting FOG. In the example of FIG. 3, the fiber coil 106 is demonstrated as having a cross-sectional height, demonstrated as a dimension "H1" corresponding to an axial dimension along the sensitive axis, that is based on being fabricated from a larger cross-sectional diameter optical fiber (e.g., 155 μm), such as in typical FOG assemblies. However, the example of FIG. 3 demonstrates a dotted line 118 corresponding to a height "H2" of the fiber coil 106 that is reduced relative to the height H1 of the typical FOG assemblies. For example, the typical FOG assemblies can have a gap between a top surface of the associated fiber coil and an opposing ceiling surface of the magnetic shield that is less than or equal to approximately 0.05" (e.g., 0.045"). However, the cross-sectional diameter of less than or equal to approximately 135 μm of the optical fiber of the fiber coil 106 can result in a fiber coil 106 having the reduced height H2 dimension relative to the fiber coil of the typical FOG (e.g., a difference in height of greater than or equal to approximately 0.1"). Therefore, the FOG assembly 100 can have a gap between the top surface of the fiber coil 106 and an opposing ceiling surface of the magnetic shield 112 that is greater than or equal to approximately 0.15" (e.g., 0.160").

The toroidal cavity 110 can be susceptible to external magnetic fields, despite the effects of the magnetic shield 112. In the example of FIG. 3, internal magnetic fields resulting from leakage of external magnetic fields are demonstrated as shaded portions that occupy the toroidal cavity 110, including in the cross-section of the fiber coil 106 and the buffer material 108, with the darker shading corresponding to larger amplitudes of the internal magnetic field. As demonstrated in the example of FIG. 3, the magnetic field is demonstrated as being the strongest in the corners at the flange 104 most distally located from the sensitive axis, demonstrated at 116, and at the opposite corners at the top of the toroidal cavity 110 most proximal to the sensitive axis 116, where the magnetic shield 112 is coupled to the axial extension of the spool 114. The magnetic field amplitude is thus demonstrated as having a gradient from the highest amplitude locations toward the center and other corners of the toroidal cavity 110.

By fabricating the fiber coil 106 using the smaller cross-sectional optical fiber at the dimensional ratio of approximately 160% with respect to the axial dimension and the radial width, the resulting FOG (e.g., interferometric FOG) can be less susceptible to errors resulting from the external magnetic fields. In the example of FIG. 3, the reduction in height of the fiber coil 106 from the height H1 to the height H2 mitigates exposure of the fiber coil to the higher amplitude portions of the external magnetic field. In the example of FIG. 3, a portion of the toroidal cavity 110, demonstrated at 120, corresponds to an empty volume of the toroidal cavity 110 that is a difference between the height H1 and the height H2. Therefore, the portion 120 corresponds to a volume that is occupied by the fiber coil of a typical FOG assembly, but not of the fiber coil 106. Therefore, the amplitude of the internal magnetic field that is demonstrated in the portion 120 does not affect the fiber coil 106. Accordingly, because the magnetic field is mitigated in the cross-section of the fiber coil 106, the resulting FOG can be less susceptible to magnetic field errors in the determination of rotation of the FOG assembly 100 (e.g., via the optical transceiver 30). As a result, by fabricating the fiber coil 106 to have a reduced cross-sectional area, such as having an axial dimension along the sensitive axis that is less than or equal to approximately 160% of a radial width based on implementing a narrower cross-sectional diameter optical fiber, the FOG can be subjected to less noise (e.g., magnetic field, thermal, and/or vibration) relative to typical FOG systems.

Figure 4:
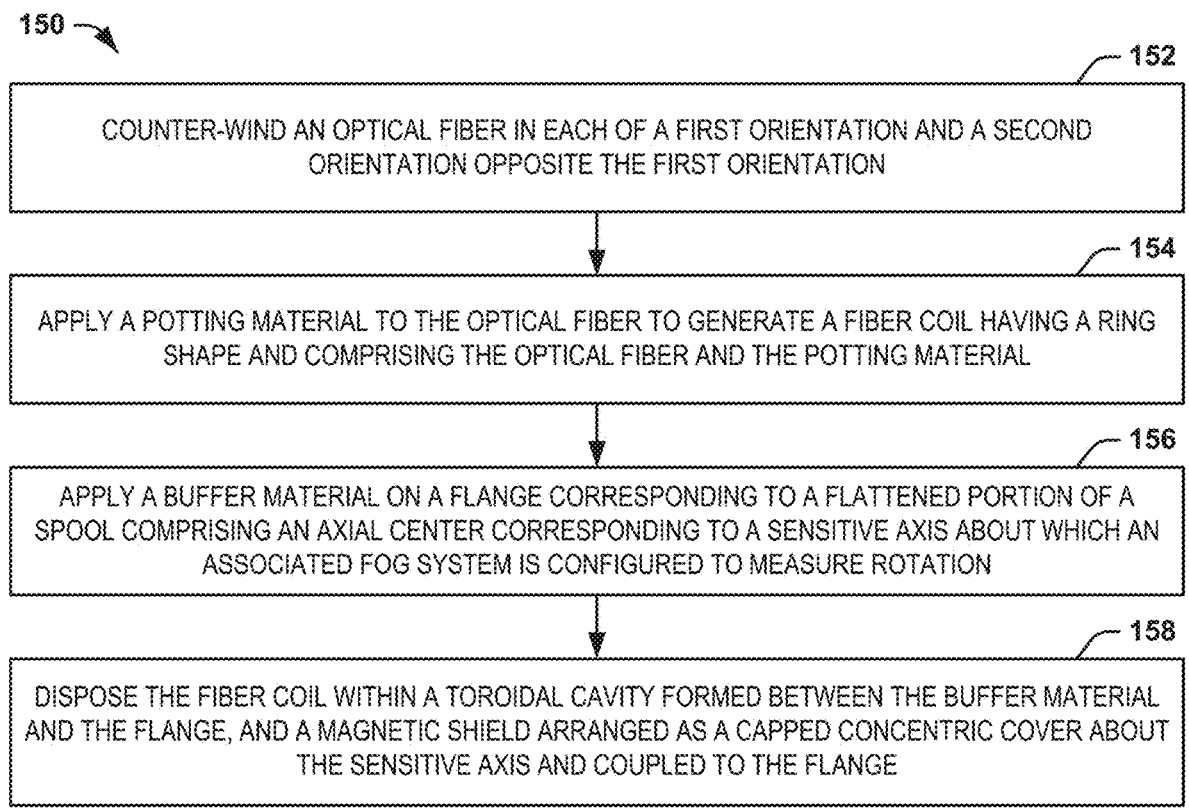
FIG. 4 illustrates an example of a method for fabricating a FOG assembly.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 150 for fabricating a FOG assembly (e.g., the FOG assembly 12). At 152, an optical fiber (e.g., the optical fiber 16) is counter-wound in each of a first orientation and a second orientation opposite the first orientation. The optical fiber can have a length that is greater than approximately 1 kilometer. At 154, a potting material is applied to the optical fiber to generate a fiber coil (e.g., the fiber coil 20) having a ring shape and comprising the optical fiber and the potting material. The fiber coil has an optical fiber density of greater than or equal to approximately 28,000 optical fibers per square inch of cross-sectional area of the fiber coil. At 156, a buffer material (e.g., the buffer material 60) is applied on a flange (e.g., the flange 18) corresponding to a flattened portion of a spool (e.g., the spool 14) comprising an axial center corresponding to a sensitive axis (e.g., the sensitive axis 67) about which an associated FOG system (e.g., the FOG system 10) is configured to measure rotation. At 158, the fiber coil is disposed within a toroidal cavity (e.g., the toroidal cavity 62) formed between the buffer material and the flange, and a magnetic shield (e.g., the magnetic shield 64) arranged as a capped concentric cover about the sensitive axis and coupled to the flange.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A fiber optic gyroscope (FOG) assembly comprising:
a spool comprising a flange corresponding to a flattened portion comprising an axial center corresponding to a sensitive axis about which an associated FOG system is configured to measure rotation;
a magnetic shield arranged as a capped concentric cover about the sensitive axis and coupled to the flange to create a toroidal cavity between the magnetic shield and the flange; and
a fiber coil disposed within the toroidal cavity and coupled to the flange, the fiber coil comprising an optical fiber which is counter-wound in a first orientation and a second orientation opposite the first orientation, the fiber coil having an axial dimension along the sensitive axis that is less than or equal to approximately 160% of a radial width corresponding to a difference between an outer radius and an inner radius of the fiber coil.

2. The FOG assembly of claim 1, wherein the axial dimension is less than or equal to approximately 0.5 inches, and the radial width is less than or equal to approximately 0.35 inches.

3. The FOG assembly of claim 1, wherein the optical fiber has a cross-sectional diameter of between approximately 125 micrometers and approximately 135 micrometers.

4. The FOG assembly of claim 1, wherein the FOG assembly further comprises a buffer material that is coupled to the flange and interconnects the fiber coil and the flange within the toroidal cavity.

5. The FOG assembly of claim 1, wherein the fiber coil has a radial pitch of at most 150 micrometers between turns in a given layer of the optical fiber in the fiber coil, and has an axial pitch of at most 140 micrometers between layers of the optical fiber in the fiber coil.

6. The FOG assembly of claim 1, wherein the optical fiber has a length of greater than or equal to approximately one kilometer, wherein the fiber coil has at least one of a number of layers of the optical fiber greater than or equal to fifty and a number of turns per layer of greater than or equal to eighty.

7. The FOG assembly of claim 1, wherein the fiber coil comprises a top surface and a bottom surface opposite the top surface, the bottom surface being coupled to the flange, wherein a distance between the top surface and an opposing interior surface of the magnetic shield is at least 0.1 inches.

8. The FOG assembly of claim 1, wherein the fiber coil has an optical fiber density of greater than or equal to approximately 28,000 optical fibers per square inch of cross-sectional area of the fiber coil.

9. An interferometric FOG comprising the FOG assembly of claim 1, wherein the interferometric FOG further comprises an optical transceiver configured to provide an optical signal in the optical fiber to determine a rotation about the sensitive axis of the FOG assembly.

10. A method for manufacturing a fiber optic gyroscope (FOG) assembly, the method comprising:
counter-winding an optical fiber in each of a first orientation and a second orientation opposite the first orientation;
applying a potting material to the optical fiber to generate a fiber coil having a ring shape and comprising the optical fiber and the potting material, such that the fiber coil has an optical fiber density of greater than or equal to approximately 28,000 optical fibers per square inch of cross-sectional area of the fiber coil;
applying a buffer material on a flange corresponding to a flattened portion of a spool comprising an axial center corresponding to a sensitive axis about which an associated FOG system is configured to measure rotation; and
disposing the fiber coil within a toroidal cavity formed between the buffer material and the flange, and a magnetic shield arranged as a capped concentric cover about the sensitive axis and coupled to the flange.

11. The method of claim 10, wherein applying the potting material comprises forming the fiber coil to have an axial dimension that is less than or equal to approximately 0.5 inches, and the radial width is less than or equal to approximately 0.35 inches.

12. The method of claim 10, wherein the optical fiber has a cross-sectional diameter of between approximately 125 micrometers and approximately 135 micrometers.

13. The method of claim 10, wherein counter-winding the optical fiber comprises counter-winding the optical fiber to have a radial pitch of at most 150 micrometers between turns in a given layer of the optical fiber in the fiber coil and to have an axial pitch of at most 140 micrometers between layers of the optical fiber in the fiber coil.

14. The method of claim 10, wherein the optical fiber has a length of greater than or equal to approximately one kilometer, wherein counter-winding the optical fiber comprises counter-winding the optical fiber to have at least one of a number of layers of the optical fiber greater than or equal to fifty and a number of turns per layer of greater than or equal to eighty.

15. The method of claim 10, wherein counter-winding the optical fiber comprises counter-winding the optical fiber to have a quadrupole wind pattern or an octopole wind pattern.

16. The method of claim 10, wherein the fiber coil comprises a top surface and a bottom surface opposite the top surface, the bottom surface being coupled to the buffer material, wherein disposing the fiber coil in the toroidal cavity comprises disposing the fiber coil such that a distance between the top surface and an opposing interior surface of the magnetic shield is at least 0.1 inches.

17. An interferometric fiber optic gyroscope (FOG) comprising:
a FOG assembly comprising:
a spool comprising a flange corresponding to a flattened portion comprising an axial center corresponding to a sensitive axis about which the interferometric FOG is configured to measure rotation;
a magnetic shield arranged as a capped concentric cover about the sensitive axis and coupled to the spool and the flange to create a toroidal cavity between the magnetic shield and the flange;
a buffer material that is coupled to the flange within the toroidal cavity; and
a fiber coil disposed within the toroidal cavity and coupled to the buffer material, the fiber coil comprising an optical fiber having a length that is greater than approximately 1 kilometer and which is counter-wound in a first orientation and a second orientation opposite the first orientation, the fiber coil having an axial dimension along the sensitive axis that is less than or equal to approximately 0.5 inches and a radial width corresponding to a difference between an outer radius and an inner radius of the fiber coil that is less than or equal to approximately 0.35 inches; and
an optical signal in the optical fiber to determine a rotation about the sensitive axis of the FOG assembly.

18. The interferometric FOG of claim 17, wherein the optical fiber has a cross-sectional diameter of between approximately 125 micrometers and approximately 135 micrometers.

19. The interferometric FOG of claim 17, wherein the optical fiber has a radial pitch of at most 150 micrometers between turns in a given layer of the optical fiber in the fiber coil, and has an axial pitch of at most 140 micrometers between layers of the optical fiber in the fiber coil.

20. The interferometric FOG of claim 17, wherein the fiber coil comprises a top surface and a bottom surface opposite the top surface, the bottom surface being coupled to the flange, wherein a distance between the top surface and an opposing interior surface of the magnetic shield is at least 0.1 inches.

21. The interferometric FOG of claim 17, wherein the fiber coil has an optical fiber density of greater than or equal to approximately 28,000 optical fibers per square inch of cross-sectional area of the fiber coil.

* * * * *